UNITED STATES PATENT OFFICE 2,481,845

PROCESS FOR CONVERSION OF PINENE TO TERPIN HYDRATE

Robert Gardner King, Norwalk, Conn., assignor to King Organic Chemicals, Incorporated, Norwalk, Conn., a corporation of Connecticut No Drawing. Application November 14, 1944, Serial No. 563,455

7 Claims. (Cl. 260—631.5)

This invention relates to improvements in the production of terpin hydrate, and in particular, to improvements in the process of producing terpin hydrate by the reaction of pinene with dilute aqueous acid.

Terpin hydrate is commonly produced by reacting pinene with dilute acid, usually 25% sulfuric acid, at temperatures of about 30 to 40° C. 10 to 15% of toluene sulfonic acid is used to promote the rate of reaction. The reaction which, as commonly carried out requires substantial time, for example, 30 to 40 hours, is accompanied by side reactions resulting in the formation of dipentene and other products which decrease the yield.

In accordance with the present invention, the reaction is carried out in the presence of greatly reduced quantities of toluene sulfonic acid and advantageously in the presence of relatively small amounts of mahogany acids. The use of reduced quantities of toluene sulfonic acid, i. e., about 2 to 5% based on the total aqueous material gives better yields than have heretofore been obtainable. The use of a relatively small proportion of mahogany acids greatly increases the speed of the reaction, such that the reaction is as complete in about 15 hours as it is in 30 to 40 hours, and also results in an increased yield through the promotion of the rate and efficiency of the main reaction without corresponding promotion of the rate of side reactions. While the use of mahogany acids with the reduced proportions of toluene sulfonic acid is of particular advantage, its use is of advantage where larger quantities of the toluene sulfonic acid are used, as in previous practice, or even where no toluene sulfonic acid is used, e. g., where sulfuric acid alone is used.

The mahogany acids may be used as acids, or in the form of the mahogany soaps which are the common form in which mahogany acids are handled. It will be noted that the reaction mixture is acid, and in view of the fact that relatively small quantities of the mahogany acids are used, it is probable that the product is present in acid form whether added as such or in the form of a soap or other compound.

The mahogany acids which are used are produced, usually as by-products, by the treatment of petroleum oils with strong sulfuric acid. They are the oil-soluble products, as distinguished from green acids, which are water-soluble products produced in such treatment. The green acids are not effective in promoting the reaction of pinene to terpin hydrate.

The high reaction rates and high yields obtainable through the use of reduced quantities of toluene sulfonic acid and the use of a small amount of mahogany acids in the reaction are shown in the following table, which gives the results of several runs for the production of terpin hydrate from pinene. The product treated was steam distilled turpentine, which is 80 to 90% pinene. Yields are based on the turpentine used. In the first run, sulfuric acid alone was used. It will be noted that at the end of 15 hours only 8.7% of terpin hydrate had been produced and in 30 hours only 33%. When 25 parts of the sulfuric acid were replaced by 25 parts of 25% toluene sulfonic acid, the yield in 15 hours was 34% and in 30 hours 59.2%. When, in addition, 2% of mahogany soap was included in the reaction mixture, the yield in 15 hours was 45.3% and in 30 hours 67.4%. Similar results were obtained using sulfuric acid and other low proportions of toluene sulfuric acid, as shown in the table. Quantities shown are parts by weight.

| | | | | | | | |
|---|---|---|---|---|---|---|---|
| Turpentine | 150 | 150 | 150 | 150 | 150 | 150 | 150 |
| 25% sulfuric acid | 500 | 475 | 475 | 460 | 460 | 440 | 440 |
| 25% toluene sulfonic acid | --- | 25 | 25 | 40 | 40 | 60 | 60 |
| Mahogany soap | --- | --- | 2 | 0 | 4 | 0 | 4 |
| Temperature, °C | 35–38 | 34–37 | 34–37 | 34–37 | 34–37 | 34–37 | 34–37 |
| 15 hr. yield per cent | 8.7 | 34.0 | 45.3 | 49.0 | 57.4 | 17.0 | 64.3 |
| 30 hr. yield do | 33.0 | 59.2 | 67.4 | 68.7 | 75.4 | 47.0 | 73.3 |
| $\frac{15\text{ hr. yield}}{30\text{ hr. yield}} \times 100$ per cent | 26.4 | 57.7 | 67.3 | 62.2 | 76.2 | 36.2 | 87.6 |

The amount of mahogany soap which is used in carrying out the process may be varied over a relatively wide range from a fraction of 1%, based on the quantity of pinene treated to as much as 10% or even more. There seems to be little advantage in using more than about 5%, but increased quantities do not seem to interfere with the production of the desired product.

I claim:

1. In the production of terpin hydrate by the treatment of pinene with dilute acid at temperatures of about 30° to 40° C., the step of including in the reaction mixture a small quantity of mahogany acids as a reaction promoter.

2. In the production of terpin hydrate by the treatment of pinene with sulfuric acid and toluene sulfonic acid at temperatures of about 30° to 40° C., the step of including in the reaction mixture a small quantity of mahogany acids as a reaction promoter.

3. In the production of terpin hydrate by the treatment of pinene with dilute acid at temperatures of about 30° to 40° C., the step of including in the reaction mixture 2 to 5% of toluene sulfonic acid as a reaction promoter, based on the total aqueous material.

4. In the production of terpin hydrate by the treatment of pinene with sulfuric acid and toluene sulfonic acid at temperatures of about 30° to 40° C., the step of including in the reaction mixture 2 to 5% of toluene sulfonic acid, based on the total aqueous material.

5. In the production of terpin hydrate by the treatment of pinene with dilute sulfuric acid at temperatures of about 30° to 40° C., the step of including in the reaction mixture a quantity of mahogany acids up to about 5% of the amount of pinene and from 2 to 5% of toluene sulfonic acid based on the total aqueous material.

6. The process in claim 1 in which the quantity of mahogany acids is of the approximate order of 1% to 10% of the amount of pinene treated.

7. The process of claim 2 in which the quantity of mahogany acids is of the approximate order of 1% to 10% of the amount of pinene treated.

ROBERT GARDNER KING.

REFERENCES CITED

The following references are of record in the file of this patent:

UNITED STATES PATENTS

| Number | Name | Date |
| --- | --- | --- |
| 2,178,349 | Sheffield | Oct. 31, 1939 |
| 2,295,705 | Weissenborn | Sept. 15, 1942 |
| 2,330,579 | Hasselstrom | Sept. 28, 1943 |

OTHER REFERENCES

Kimura, Jour. Soc. Chem. Ind., Japan, vol. 40, July 1937, page 237B.